United States Patent Office 3,446,359
Patented May 27, 1969

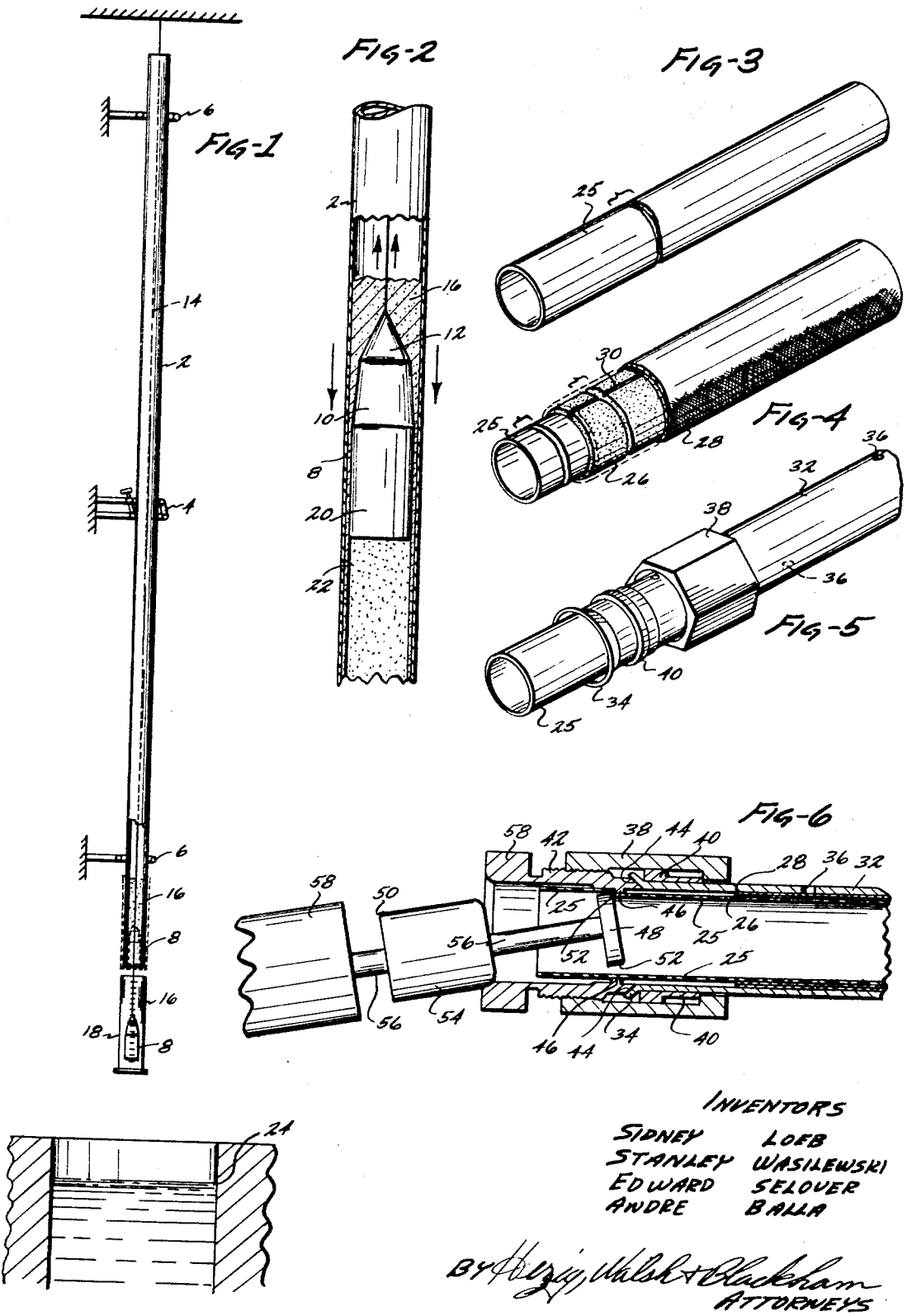

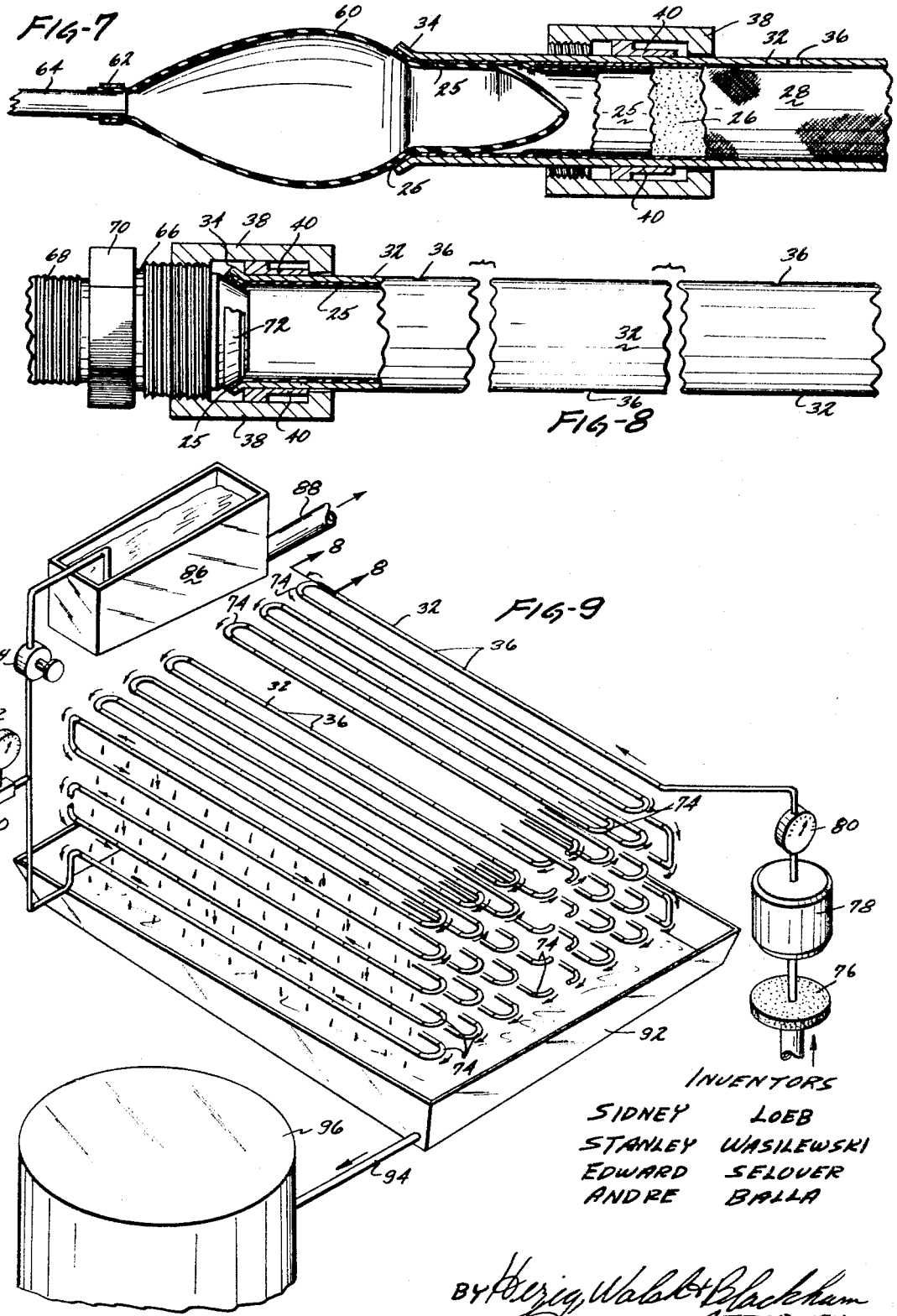

3,446,359
DESALINATION ASSEMBLY AND ITS METHOD
OF MANUFACTURE
Sidney Loeb, Los Angeles, Stanley Wasilewski, Santa Monica, and Edward Selover and Andre Balla, Los Angeles, Calif., assignors to The Regents of the University of California, Berkeley, Calif., a corporation of California
Filed July 20, 1965, Ser. No. 473,449
Int. Cl. B01d 13/04
U.S. Cl. 210—490                    15 Claims

ABSTRACT OF THE DISCLOSURE

Reverse osmosis apparatus adapted for water desalinization is prepared by dissolving a cellulose derivative such as cellulose acetate and pore-producing agent in a solvent, such as formamide and acetone, casting the resultant solution as a thin tubular sheet on a tube as mandrel, and curing by heating under pressure in place in or on the perforated supporting tube or pipe.

---

This invention relates to reverse osmosis processes, particularly the desalination of sea water or brakish water, and to methods of making apparatus for desalination.

Continuing research by the assignee of this invention, and others, has provided membranes which are practical and efficient for separation of solutes from a solution. Such membranes are utilized by maintaining the solution in contact with the membrane at a pressure exceeding the vapor pressure of the solution. The nature of reverse osmosis, as used herein, and the formation of membranes therefor, as set forth more fully in United States Patents 3,133,132 and 3,133,137 and, in the following pending applications assigned to the assignee of the present application, the disclosures of which are incorporated herein by reference:

"Fresh Water Recovery," Ser. No. 197,609, filed May 25, 1692, by Sidney Loeb now Patent No. 3,364,288;

"Desalinization Membrane," Ser. No. 354,775, filed Mar. 25, 1965, by Serop Manjikian, Sidney Loeb and Joseph W. McCutchan now Patent No. 3,344,214;

"Method of Desalinizing Water," Ser. No. 349,756, filed Mar. 5, 1964, by Sidney Loeb and Serop Manjikian now Patent No. 3,310,488;

"Method of Forming Porous Membranes," Ser. No. 304,228, filed Aug. 23, 1963, by Sidney Loeb and Gargeswari R. Nagaraj now Patent No. 3,283,042; and "Method of Forming Porous Membranes," Ser. No. 304,243, filed Aug. 23, 1963, by Sidney Loeb and Gargeswari R. Nagaraj.

Reverse osmosis, as applied to desalination of sea water or brackish water, for example, is theoretically more efficient than distillation of freezing techniques requiring a change of state of the saline water. This is particularly the case since the pressures needed to obtain reverse osmosis desalination may readily be obtained in the ocean, so that the only energy input would be that required to bring desalinized water to the surface or point of use.

To date, in larger plants, distillation and freezing techniques have found favor, in part because of the accumulated technology and standard equipment already developed for distillation and freezing plants for other purposes, such as power generation.

Reverse osmosis filtering cells employing membranes in the form of a flat sheet, such as those disclosed in United States Patents, 3,133,132 and 3,133,137, provide effective and efficient desalination, but at present require relatively expensive non-standard fittings and parts, and means for providing flow or turbulence in the solution in contact with the membrane to limit solute concentration build-up immediately adjacent the membrane surface and for most efficient performance.

It also has been proposed to use integrally lined tubular assemblies employing special high-strength porous plastic tubes, which might be made with fiber glass, and to which a reverse osmosis membrane is bonded. Again, however, such an assembly would appear to require presently non-standard equipment and fittings, and may require relatively elegant fabrication techniques to obtain satisfactory membrane production and the avoidance of possible difficulties such as clogging of the porous plastic tube.

Accordingly, it is an object of the present invention to provide economical and efficient reverse osmosis apparatus, and methods of making such apparatus.

It is a further object of the present invention to provide methods of making desalination apparatus in which all components auxiliary to the membrane are standard, commercially available, relatively low-cost materials.

It is a still further object of the present invention to provide a simple and inexpensive method of forming tubular reverse osmosis membranes.

Another object of the invention is to provide a method of making tubular desalination assemblies in which the membrane may readily be inspected for quality control and in which clogging of a support layer providing a low-resistance path for desalinized water is minimized or eliminated.

Yet another object of the invention is to provide a method of making tubular desalination assemblies in which the cured reverse osmosis membrane material is not subject to flexing, or to stresses or strains other than compression in use.

Yet another object of the invention is to provide desalination assemblies adapted to treat a single flow of increasingly concentrated solution, and to provide a method of making a reverse osmosis channel of increasing salt-reduction performance by change of only one easily-controlled variable.

In general, the invention concerns the formation of reverse osmosis apparatus by dissolving a cellulosic derivative and a pore-producing agent, as taught by the above-mentioned patents and applications, and casting the resultant solution as a thin tubular sheet which thereafter is cured to obtain the desired salt-reduction ratio and flux by heating. Preferably the membrane is cured by heating it under pressure in situ in the perforated supporting tube or pipe to be used in desalination, from which it is separated by one or more layers of porous material providing a low-resistance path for desalinized water which has passed through the membrane, to the perforations in the supporting tube or pipe.

It will be understood that in operation of a completed composite tubular assembly of the invention, as a solution passes along the tube at the pressure necessary to obtain reverse osmosis, desalinized water continuously is removed from the stream, so that the salt content steadily increases downstream. A channel bounded by membrane of appropriately increasing salt-reduction ratio may readily be obtained, according to the invention, by making more than one composite tubular assembly in the same manner and with the same materials except that the later units are heated to a higher temperature in the curing step. Connection of the units in series, as formed, provides the desired channel.

Further objects and additional advantages of the invention will become apparent from the following description and annexed drawings wherein:

FIGURE 1 is a side elevation of membrane casting apparatus which may be employed in the invention;

FIGURE 2 is an enlarged sectional view of a casting tube and spreader which may be employed in the invention, indicating alternate means of obtaining relative movement therebetween;

FIGURE 3 is a perspective view of a tubular membrane sheet of the invention;

FIGURE 4 is a perspective view of the sheet of FIGURE 3 with two layers of porous wrap;

FIGURE 5 is a perspective view of the tubular sheet of FIGURE 4 in a run tube prior to trimming;

FIGURE 6 is a sectional view of cutting apparatus for trimming the membrane sheet of FIGURE 5;

FIGURE 7 is a sectional view of flaring of the trimmed end of the membrane sheet of FIGURE 6;

FIGURE 8 is a cross-sectional view taken along lines 8—8 of FIGURE 9, showing a joint sealing the flared end of the membrane sheet of FIGURE 7; and FIGURE 9 is a perspective view, partially diagrammatic, of a desalination plant of the invention.

Without recapitulating all the disclosure of the previously mentioned patents and applications, and other disclosures such as Report No. 65–13 of the U.C.L.A. Department of Engineering of the assignee of this application, entitled "Semi-Permeable Desalination Membranes From Organic Casting Solutions" and published May 1965, it may be said that a large and steadily growing group of semi-permeable cellulosic membrane systems have been developed which provide reverse osmosis performance. These systems comprise a solution of film-forming cellulosic derivatives known to the art, such as various cellulosic ethers, esters, mixtures of ethers and esters, and other cellulosic derivatives, and a pore-producing agent, often also referred to as a "pore-producing additive," which is added to the cellulosic casting solution, and, upon appropriate formation of the cellulosic film, provides an osmotic film membrane which is permeable to solvent but not to solute. "Pore-producing," as used and explained in said disclosures, refers to production of the osmotic characteristics of the membranes as a whole, without necessarily referring merely to the production of simple discrete physical pores.

Included among such systems are quaternary systems utilizing the cellulosic derivatives, a solvent therefor, water, and a pore-producing agent; ternary systems in which the water is omitted; and binary systems in which the pore-producing agent also serves as the solvent for the cellulosic derivatives. Various refinements in the preparation and use of the membranes of such systems, such as the use of pore-regulating and treating salts, and techniques for treatment of, and efficiency in, handling the flow of solution to be desalinized, have also been developed.

The precise nature of the chemical and physical organization of the membranes obtained from such systems, and their resultant manner of operation in reverse osmosis, is still a subject of debate. However, it is presently believed that the critical performance region of the membranes is an extremely fine layer at the surface of the membrane in contact with the solution in reverse osmosis. Although uncured membranes of these systems may be flexed and subjected to various tensile stresses and strains and yet obtain efficient desalination performance (so long as the membrane never is permitted to dry out) upon curing at the appropriate temperature to obtain the desired salt-reduction ratio and flux, flexing of the membrane or its subjection to any stresses or strains after curing (other than the inevitable compression associated with the pressure drop across the membrane in performance of reverse osmosis) decreases the subsequent performance of the membrane in reverse osmosis.

Although any of the semi-permeable cellulosic membrane systems may be employed in the present invention upon appropriate compliance with the conditions for forming effective osmotic film membranes with the particular system, as will readily be understood by those skilled in the art, it is presently preferred to use the system disclosed in co-pending application Ser. No 354,775 now Patent No. 3,344,214 because of the excellent salt-reduction ratios and flux obtained thereby, as well as the ease of handling such system at ambient temperatures. However, the systems of United States Patents 3,133,132 and 3,133,137, although less simply handled at ambient temperatures, may also be employed with particular profit in the present invention.

By way of example, and for ease of description, the invention will be described in terms of the system of United States application Ser. No. 354,775 now Patent No. 3,344,214, in which a typical casting solution comprises cellulose acetate dissolved in acetone and formamide, with these components in the ratio, respectively, of 25:45:30 by weight.

Such a solution is rather viscous, and may readily be handled and cast at room temperature. The casting may be performed with the apparatus shown in FIGS. 1 and 2, in which casting tube 2 may be an ordinary pipe, preferably with an inner diameter such that the outer diameter of a gelled tubular membrane sheet removed from the casting tube 2, plus the thickness of any porous wraps added to the tubular membrane sheet, equals or approximates the inner diameter of the run tubes to be used in the performance of reverse osmosis, as hereinafter described. Casting could be performed in the run tube, as by blocking preformed perforations in the run tube during casting or by adding perforations after the casting process is complete, but the use of separate tubes for casting and run purposes presently is preferred.

The casting tube 2 is supported by releasable clamp 4 and held in position by guide loops 6, 6. A spreader 8, preferably having two cone-tapered sections 10, 12 on its leading end, is attached at its leading end to cord 14 for relative movement axially of tube 2. The combination of an adequately long cylindrical body section 20 (e.g., 3 inches long for use in a casting tube approximately 1 inch inner diameter) and one or more cone-tapered sections 10, 12 in spreader 8 provides a self-centering effect for the spreader 8 in passage through the tube 2 which reduces or eliminates the need for any other centering means.

The casting solution 16 may be placed in the lower end of casting tube 2 ahead of spreader 8 by raising a graduate cylinder 18 of greater inner diameter than the outer diameter of casting tube 2 which contains casting solution 16, over the spreader 8 suspended below the bottom of casting tube 2, and then raising it over the bottom end of casting tube 2 and raising the spreader 8 into casting tube 2 by drawing up cord 14, as indicated in broken lines in FIG. 1.

The cylindrical body section 20 of spreader 8 has an outer diameter smaller than the inner diameter of casting tube 2 by twice the desired as-cast thickness of the membrane. As-cast membrane thicknesses of about .015 inch presently are preferred since membranes less thick than about .010 inch frequently are so adhesive that they are difficult to remove from the casting tube after immersion without suffering damage. Membranes thicker than about .050 inch presently are not preferred, since such added thickness appears unnecessary and merely adds to the path through which the desalinized water in reverse osmosis must pass.

The spreader 8 may then be moved axially through tube 2 by drawing up cord 14 (indicated by the upwardly pointing arrows in FIG. 2) as by pulley means (not shown) connected to cord 14 above the upper end of tube 2.

Drawing spreader 8 through tube 2 in this manner, with casting solution 16 above spreader 8, leaves behind spreader 8 a film 22 of the casting solution with the desired as-cast thickness. The viscosity and surface adhesion of the casting solution is such that the film 22 on the inner walls of tube 2 does not sag or run appreciably in performance of the process described herein.

However, drawing spreader 8 through tube 2 presently is not preferred because the film 22 is exposed to the atmosphere for varying periods of time along the length of tube 2 as spreader 8 moves up through the tube 2. Also, since the evaporating acetone solvent is heavier than air a reverse chimney effect is obtained which accentuates greater evaporation from film 22 in the lower part of tube 2 than in the upper part thereof.

The velocity of the movement of the spreader 8 relative to the casting tube 2 preferably is uniform, but in casting a tube of approximately 1 inch diameter it may vary between 15 and 250 inches per minute and still provide a satisfactory film. Particularly with slower relative movement, however, the casting solution must be sufficiently viscous that no appreciable sagging of the film 22 takes place. A satisfactory casting solution for even relatively slow relative movement of the spreader 8 and the tube 2 has a viscosity such that a 3/32 inch stainless steel ball will drop through the solution at a rate of about 1 and 1/4 inches per minute.

It presently is preferred to hold the spreader 8 stationary by means of cord 14 and to obtain relative movement by releasing clamp 4 so that tube 2, held against sideward movement by loosened clamp 4 and guide loops 6, 6, falls into immersion tank 24. The viscosity of the casting solution 16 is such that this free fall, in the example given, with a steel casting tube 2 approximately 11 feet long, a one inch outer diameter, and walls .049 inch thick, is completed in about 45 seconds, providing a relative rate of movement within acceptable limits.

During the falling of casting tube 2 into immersion tank 24 a constant length of the film 22 between the bottom of spreader 8 and the surface of the water in immersion tank 24 (a distance preferably between 1 to 3 feet) is exposed to the atmosphere. Since the rate of fall of the tube 2 is substantially uniform, each portion of the film 22 is exposed to evaporation for a substantially uniform period of time, and since the exposed portion of the interior of tube 2 is sealed at the upper end by the spreader 8 and at the lower end by the water in immersion tank 24, no reverse chimney or other draft effect of significance is present. Thus, membranes of greater uniformity are obtained since, as explained in the disclosures previously referred to, removal of solvent from the cast film has an important controlling effect upon the performance of the completed membrane in reverse osmosis; therefore free fall of the tube 2, indicated by the downwardly pointing arrows in FIG. 2, presently is preferred.

In an event, immediately after casting film 22 on the inner wall of casting tube 2, the tube 2 and film 22 are immersed in water, as in tank 24. The water may be as warm as 30° centigrade or more, but the finished tubular membrane sheet appears better if the water temperature is between 0 and 5° centigrade.

The tube 2 with film 22, when immersed in water at 0° C., is kept in tank 24 for at least one hour. During immersion more of the solvent in the film 22 is removed by diffusion into the water in tank 24. It has been found that all of the solvent removal may be accomplished by diffusion into water i.e., no evaporation into the atmosphere is necessary to produce satisfactory membrane. However, of course, excessive evaporation must be avoided.

The solvent removal continues until the casting solution 16 in film 22 "gells" in the sense that it achieves discrete physical strength, so that it may be removed from casting tube 2 as tubular membrane sheet 25, shown in FIG. 3. The period of water immersion required may readily be learned by feeling the sheet 25 to determine whether it is continuing to increase in physical strength. Excessive water immersion does no harm; in the example under consideration, the period of immersion in water between about 0° C. and 5° C. should be about 1 hour or more.

It will be understood that the water immersion may be accomplished by circulating water through the inside of the tube, as well as by other expendients, rather than by immersion in tank 24.

The tubular sheet 25 is removed from the casting tube 2 simply by grasping one end of it and gently drawing it out of casting tube 2. At this point it may easily be examined and tested, both visually and otherwise, to maintain quality control in production.

Although presently more expensive means for providing a low-resistance path for flow of desalinized water to the exists from run tubes, and more closely spaced perforations in the run tubes (as described below), may be used, it is presently preferred to wrap the tubular sheet 25 in one or more layers of porous material, as illustrated in FIG. 4.

FIG. 4 illustrates a single layer of filter paper 26 (such as that commercially available as Whatman 41H high wet strength filter paper) which has been wrapped around the sheet 25 and then covered with a double thickness of coarse porous wrap 28, such as an ordinary woven nylon fabric or parchment (commercially available as French Fabrics 627T).

The smooth porous layer 26 and the coarse porous wrap 28 both preferably are cut as a single long rectangular sheet such that when wrapped longitudinally around membrane 25 the side edges of the sheet 26 or 28 meet exactly. However, it is more important in avoiding exercise of the membrane sheet 25 to prevent a small overlap of the wraps, particularly the inner smooth porous wrap 26, than to prevent a small gap, such as gap 30, between the side edges of the wrap.

When multiple layers of wrap are used they are preferably coterminous, near the ends of membrane 25, as indicated in FIG. 4, in which outer wrap 28 has been cut back to better illustrate inner wrap 26. The membrane tube 25 preferably extends beyond both ends of the porous wrap.

Although a single layer of wrap, or multiple layers of a coarse porous wrap without a smooth porous layer may be used, the combination illustrated in FIG. 4 presently is preferred because the smooth porous wrap 26 minimizes membrane embossing by plastic extension of the finished membrane under high pressure, which causes exercise of the membrane structure which is deleterious to desalination performance, and the coarse porous wrap 28 provides an excellent low-resistance path for the desalinized water to exit from the supporting structure such as the run tubes described below.

Formation of the desalination assembly may of course be radially reversed to provide assemblies to be immersed in solution under pressure (e.g., beneath the ocean), so that the porous layer, such as wraps 26 and 28, is positioned within a tubular membrane sheet 25 which has been cast on the outside of a casting tube 2 (to provide the essential desalinizing layer on the outside of the tubular membrane sheet 25) which together are then placed on the outside of the run tube rather than the inside of it. Other ways of placing the low-resistance porous layer between the membrane sheet 25 and the supporting structure, such as wrapping a run tube prior to positioning the tubular membrane sheet 25, may be utilized.

In the presently preferred method, after the tubular membrane sheet 25 has been wrapped, the sheet 25 and its wraps 26, 28 are inserted in a run tube 32. The run tube 32 may be ordinary commercial pipe, of the type appropriate for the pressures at which reverse osmosis is performed, having flared lips 34 at its ends. In the present example, in which the casting tube 2 has a one inch outer diameter and walls .049 inch thick, the run tube 32 may be ordinary steel pipe with a one inch outer diameter and walls about .035 inch thick, with a length of about 10 feet. The length of the membrane 24, when inserted, extends beyond both ends of the run tube 32, but the porous layer such as wraps 26, 28 falls slightly short of the ends 34 of the run tube 32, such as about one inch short in the present example.

The run tube 32 has perforations 36, spaced at intervals along the length covered by the porous layer such as wraps 26, 28. In the present example perforations 36 are merely one-sixteenth inch diameter holes drilled through the pipe at three inch intervals alternately on opposite sides of the pipe 32.

After insertion in the run tube 32 the membrane tube 24 is trimmed at both ends, as for example with the cutting apparatus illustrated in FIG. 6. Nut 38, with sleeve 40 between it and run tube 32 (both nut 38 and sleeve 40 being standard fittings with commercial pipe such as run tube 32), holds threaded cutter insert 42 firmly in position with end 44 (shaped to fit flared tube end 34) centering cutter insert 42 against tube end 34. Shoulder 46 around the inner circumference of cutter insert 42 is spaced away from end 44 such a distance that when membrane sheet 24 is cut at shoulder 46 and thereafter flared as described below it will be coterminous with flared lip 34 of run tube 32.

Head 48 of cutter tool 50 has a diameter somewhat less than the inner diameter of run tube 32, so that its circumferential sidewalls 52, upon rotary movement of cutter tool 50 at an angle to run tube 32, press and cut off the membrane sheet 25 against the edge of shoulder 46. This action is aided by roller 54 on shaft 56 of cutter 50, which bears against the outer end 58 of cutter insert 42, spaced at the appropriate distance from shoulder 46, upon insertion and rotation of cutter tool 50, as by manipulation of handle 58.

The clean uniform trimming of membrane 25 at shoulder 46 at each end of run tube 32 leaves a length of membrane 25 which may be flared after removal of cutter insert 42, to conform closely to the flared lips 34 at the ends of run tube 32. Since flaring the end of the tubular membrane sheet 25 to the conical shape of lip 34 requires plastic extension which imposes strain on that portion of the membrane sheet 25, it is preferred to soften the short length of membrane 25 adjacent lip 34 either by heating it in water 70° C. or higher, or by moistening it with a plasticizer softening solution such as a mixture of 9 parts by volume of n-propyl alcohol and 1 part by volume of triacetin. Also, in the example under consideration, a cellulose acetate polymer of higher molecular weight material than that described in the disclosures referred to previously, such as Eastman Kodak E-398-10, is used in the casting solution 16.

When the end of membrane 25 has been softened it is easily flared by inserting a flexible tube or balloon 60 into it and distending the balloon 60 pneumatically or hydraulically, as by forcing air or water into balloon 60 through nozzle 62 and tube 64, which may be connected to a source of fluid under pressure (such as ordinary tap water) or blown up like a balloon used as a plaything.

The balloon 60 may readily be removed by deflation and withdrawal of the portion of it inserted within run tube 32. It must be kept in mind that during the flaring operation, as at all times during its preparation and operation in reverse osmosis, the membrane 25 must not be permitted to dry out.

The flared membrane 25 in place with its porous wraps 26, 28 in run tube 32 in which it may be used in desalination, is now ready for the heat treatment which tailors it precisely for the service requirements it must meet. Although this heat treatment may be accomplished by immersing the complete run tube 32 assembly in water to obtain the conditions described below, preferably it is accomplished by passing water at the desired temperature through run tube 32 under pressure.

The run tube 32 assembly may be joined and sealed to a separate source of heating water, and may also be joined and sealed in the completed desalination assembly illustrated in FIG. 9, with the standard commercial pipe-fitting components shown in FIG. 8. The seals obtained in this manner readily withstand the pressures of 1,500 p.s.i. or more which are used in desalination of sea water.

A standard threaded nipple 66, which in turn may be connected to other piping indicated at 68 by nut portion 70, either for treatment purposes or for reverse osmosis operation, is held by nut 38 with conical nipple section 72 bearing against flared lip 34 of run tube 32. Satisfactory seals may be obtained by placing conical nipple section 72 directly against the flared portion of membrane 25 adjacent lip 34. However, this generally requires the application of greater torque to the fitting in order to obtain a high pressure seal. This greater torque increases the possibility of either plastic extrusion of the membrane 25 at the seal, or of twisting of the membrane 25 with respect to run tube 32, both of which should be avoided. Twisting of the membrane 25 is particularly undesirable since it may cause exercise of the portions of membrane 25 which will perform desalination in operation. Subjection of the surface of membrane 25 to any stresses or strains other than its compression in use is definitely deleterious to its desalinizing performance.

It is therefore preferred, although not necessary, to place flat rubber gasket 74 over conical nipple portion 72 so that it bears against membrane 25 at lip 34 of run tube 2. Satisfactory seals can then be obtained with a torque of ten foot pounds or less.

Bringing membrane 25 to the proper temperature to complete the physical and chemical organization of the membrane layer which performs removal of solutes from the solution is essential to curing the membrane for optimum performance under service conditions. In general, the higher the temperature at which the membrane is cured the greater is the salt reduction obtained. Correlatively, however, greater salt reduction generally results in a lower flux rate through the membrane. Therefore the optimum membrane is one which provides solute reduction which produces the desired product (e.g., potable water) from the feed solution at the maximum obtainable flux rate. Salt reduction performance of a membrane is most easily expressed in terms of a ratio of the salt concentration in the feed solution to the salt concentration in the desalinized product. The flux rate of production of desalinized product through the membrane is expressed in terms of quantity of product per unit area of membrane per time period, usually gallons per square foot per day.

Table A, below, illustrates the control of salt reduction performance and flux which is obtained by variation of the temperature to which the membrane is brought in curing. The figures in Table A represent early, rough readings of a pilot plant, made with the use of the present invention with formamide as the pore-producing agent, in which the salt concentration of the product was measured by conductivity, and in which both the salt reduction and the flux measurements are not precise. The table is fully reliable, however, in illustrating the ready control of performance obtained by different curing temperatures.

The pilot plant from which these readings were taken began supplying potable water to the regular drinking water system of the city of Coalinga, Calif. on June 17, 1965. To the best of applicant's knowledge, this is the first time that desalinized water produced by reverse osmosis has been used for ordinary, regular drinking water.

TABLE A

| Membrane heating temperature, ° C. | Flux, gal./sq/ft./day | Salt reduction ratio |
| --- | --- | --- |
| 72 | 67 | 6 |
| 76 | 58 | 8 |
| 80 | 45 | 20 |
| 84 | 33 | 33 |
| 88 | 19 | 55 |

Since any plastic extension of the finished membrane 25 is deleterious to desalination performance, and since the operating pressures in reverse osmosis are quite high, optimum membrane fabrication and performance is attained (even when using relatively loose fits between membrane 25, porous wraps 26 and 28, and run tube 32 to facilitate easy assembly and inspection) by performing final curing of membrane 25 in place in run tube 32 in such a manner that no further movement of membrane 25 and no further non-operating stresses and strains thereon are necessary.

Heating water is passed through the completed run tube 32 assembly at a slight positive pressure. This pressure preferably exceeds the yield strength of the membrane 25 at that temperature, so that membrane 25 is pressed firmly against its supporting wraps 26, 28 and run tube 32 while final membrane structuration occurs.

In the present example, the high temperature yield pressure of membrane 25 is on the order of 4 to 6 p.s.i.g. for temperatures between about 75° C. and 95° C. The heating is carried out for about 4 to 10 minutes, which is sufficient time for the membrane 25 to have reached a steady condition at that temperature. The flow rate of heated water through the run tube 32 assembly is merely enough so that the temperature drop from one end of the tube to the other is less than about one-half ° C. Under normal conditions, with a run tube of about one inch inner diameter and about ten feet long, with heating to about 85° C., a flow rate of 3½ g.p.m. suffices.

Since the water to be desalinized in operation usually will be considerably cooler than the temperatures to which the membrane 25 is brought to effect final curing, and since in any event the completed run tube 32 assembly will be stored for varying lengths of time at ambient temperature prior to use in service, it is preferred to follow the heating step immediately by cooling the run tube 32 assembly to the temperatures at which it will be used in service, or to ambient temperature. This cooling, effected simply by passing water at the appropriate temperature through the run tube 32 assembly, preferably is carried out at a pressure exceeding the yield strength of the membrane 25 at the cooling temperature. The intent of immediate cooling at a pressure in excess of the yield strength of the membrane 25 is to prevent the subsequent subjection of the membrane 25 to contractile stresses and strains, relatively long after curing is complete, which harm membrane performance.

The cooling is continued merely long enough to ensure that the membrane 25 and run tube 32 are brought to the desired temperature; 2 minutes cooling, at a flow rate of about 3½ g.p.m., has proven sufficient in the example given to prepare the run tube 32 assembly for service at temperatures on the order of 15° C. or less.

In practice, to ensure that the membrane 25 is finally cured in position so that it will not later be subject to exercise in desalination performance, the yield pressure of the membrane 25 usually is exceeded somewhat, so that a typical curing cycle comprises heating at 7 to 8 p.s.i.g. for about 10 minutes, followed by cooling at about 12 p.s.i.g. for 2 minutes or more The cured run tube 32 assembly may be stored, pending use in desalination, by filling it with water and capping its ends. Preferably the storage water is treated to prevent growth of algae and the like during storage; but so long as the membrane 25 is kept wet and is not subjected to a negative pressure which would flex it or exercise it by moving it away from its supporting wraps 26, 28, it retains effective desalinating ability even after weeks of storage.

It has been noted that there appears to be some tendency for the membrane 25 to increase in flux and decrease in salt reduction ratio performance after prolonged storage; however, re-curing it by passing heated water under pressure through the run tube 32 assembly, at the temperature which provides precisely the desired combination of salt reduction performance and flux rate, will restore the membrane to precisely the desired service performance.

It has also been noted that the heating temperatures required in curing to obtain a fixed salt reduction ratio for a membrane which is cured under pressure in the method of the present invention usually is about 3° C. higher than the temperature required to obtain equivalent performance from the flat sheets discussed in the previous disclosures. It is believed that this is because the pressure-cured membrane tube is not allowed to undergo thermal shrinkage, as is the flat sheet.

The cured run tube 32 assemblies may be employed in desalination in a plant of the type illustrated in FIG. 9. A plurality of the run tubes 32, each containing a fully-cured membrane sheet 25 and supporting porous layer such as wraps 26, 28, are connected in series by standard commercial U-joints 74 with the use of the seals illustrated in FIG. 8.

The feed (whether sea water, brackish water, or other solution) passes through filter means 76 to remove particulate and gross organic matter which might harm the pump and other parts of the assembly to pump 78 which pumps it through the assembly at the pressure necessary to obtain reverse osmosis. Pumps 78 is automatically controlled so that the pressure in the system, as read at gauges 80, 82 remains at the level required for reverse osmosis for the particular solution being desalinized. Pressure regulator valve 84 at the brine discharge end of the assembly maintains pressure within the assembly at the desired level and discharges the brine at low pressure to brine accumulator tank 86, which in turn, as indicated schematically at 88, is connected to a drain for discharge of the brine. Brine accumulator tank 86 preferably is placed at a level above the assembly of run tubes 32, and a second back-pressure regulator valve 90 balanced against the atmosphere is provided at the end of the line, as indicated at 90, so that in the event of a rupture at some point in the assembly of run tubes 32 which might tend to create a less-than-atmospheric pressure at some point in the run tubes 32 which might flex the membrane 25 away from its operating position, an input of atmospheric pressure and/or back flow of brine would be obtained which would minimize or eliminate the temporary reverse pressure causing such flexing of membrane 25.

In operation of a plant such as that illustrated in FIG. 9 the desalinized product flows through the perforations 36 in run tubes 32 and may readily be collected by letting it fall into collecting means such as trough 92 beneath the assembly from which it may flow through piping as indicated at 94 to a storage tank as indicated at 96 or directly into a water supply system.

Table B below provides an analysis of the product desalinized water produced in early operation of the experimental plant at Coalinga, California, from a brackish water feed. The figures are not precise and contain certain anomalies (e.g., greater phosphates and iron and alumina as $R_2O_3$ in both the product and brine than in the feed) but the overall pattern is a fully correct representation of the performance of the desalination assembly. It will be noted that not only is the sodium chloride level reduced to well within acceptable limits for potable water, but also that the membranes have an excellent effect in "softening" the water. In many areas consumers are put to considerable expense to overcome the undesirable effects of "hard" water, which are largely associated with a high level of divalent ions from dissolved minerals such as limestone in the water. The membranes utilized in the present invention tend to have an even higher salt reduction performance for divalent ions than for monovalent ions, and therefore are particularly effective in "softening" the water they treat.

A very significant advantage of the present invention with respect to obtaining maximum efficiency in operation with simple and inexpensive manufacturing techniques lies in the fact that as the feed solution moves from the pump 78 through the assembly of run tubes 32 and

TABLE B

| | Feed | Product | Brine |
|---|---|---|---|
| pH | 7.5 | 7.4 | 7.5 |
| Iron (Fe), mg./l. | 0.18 | 0.01 | 0.01 |
| Hydroxide (OH), mg./l. | Nil | Nil | Nil |
| Boron (B), mg./l. | 2.5 | 2.3 | 3.4 |
| Carbonates ($CO_3$), mg./l. | Nil | Nil | Nil |
| Bicarbonates ($HCO_3$), mg./l. | 161.7 | 18.3 | 271.5 |
| Chlorides (Cl), mg./l. | 258.9 | 70.9 | 407.8 |
| Sulphates ($SO_4$), mg./l. | 1,223.5 | 21.0 | 2,182.3 |
| Phosphates ($PO_4$), mg./l. | 0.1 | 0.2 | 0.3 |
| Silica ($SiO_2$), mg./l. | 44.4 | 11.6 | 70.4 |
| Iron and alumina ($R_2O_3$), mg./l. | 3.2 | 4.0 | 5.6 |
| Calcium (Ca), mg./l. | 128.5 | 5.1 | 224.4 |
| Magnesium (Mg), mg./l. | 87.9 | 4.9 | 150.2 |
| Sodium (Na), mg./l. | 558.0 | 59.0 | 958.0 |
| Total hardness (as $CaCO_3$), mg./l. | 687.3 | 32.2 | 1,186.6 |
| Total hardness (as $CaCO_3$), g.p.g. | 40.1 | 1.9 | 69.2 |
| Total incrustating solids, mg./l. | 734.9 | 47.8 | 1,262.6 |
| Total incrustating solids, g.p.g. | 42.9 | 2.8 | 73.6 |
| Free carbon dioxide ($CO_2$), mg./l. | 8 | 1 | 14 |
| Total dissolved solids (residue), mg./l. | 2,372.4 | 165.6 | 4,148.8 |

Mg./l.—milligrams per liter; g.p.g.—grains per gallon.

fittings such as U-joints 74 it not only is constantly refreshed and mixed so that salt concentration build-up immediately adjacent membrane 25 is not a problem, but also the concentration of salts in the feed, at a steady flow rate of feed, increases steadily to the levels reached in the brine discharged at the end of the assembly (as exemplified by the data in Table B). The level of salt concentration in each run tube 32 may easily be calculated and determined for any given flow rate. Satisfactory operation may be achieved within very wide ranges of flow rates; in initial operation of the Coalinga plant a flow rate of between 7 and 7½ gallons per minute was used.

A membrane 25 precisely adapted to meet the salt reduction requirement in each particular run tube 32, with maximum flux of desalinized product, can be provided for each run tube 32 in the assembly by sequential manufacture of otherwise identical run tube 32 assemblies with variation (which may be as finely controlled as desired) of the temperature of the heating water used in curing the membranes 25. So long as the pressures used in the heating and cooling steps exceed the yield strength of the membranes 25 at all temperatures in the range of temperatures used, nothing other than change of the heating water temperature is needed to provide the full range of varying salt reduction performance and flux of membranes 25 for the complete plant.

The early experimental membranes 25 whose performance is indicated in Table A, heated at more or less arbitrarily chosen temperatures, illustrate fairly crude control of performance; in a large non-experimental plant for maximum efficiency much finer control, with many much smaller changes in performance of the run tubes 32 connected in series for increasing salt reduction performance from the feed inlet to the brine discharge ends of the assembly, could be provided.

Although the data given in Tables A and B are taken from a plant designed to treat brackish water, the invention is equally applicable to desalination of sea water. The use of slightly higher curing temperatures provides membranes 25 having salt reduction ratios well in excess of the 75 or greater level required to produce potable water from sea water. Desalination of highly saline solution such as sea water may also be achieved with the use of the present invention in multiple pass systems, such as a two pass system, using membranes 25 with much lower salt reduction ratios and passing the product from an initial run through a plant as the feed solution for a second or subsequent run through the plant.

It will be understood that the requirements for auxiliary equipment in a plant such as the one illustrated in FIG. 9, which are primary that the feed solution be provided at the desired pressure and flow rate for the particular reverse osmosis operation to be performed, and that safety precautions against rupture and reverse pressure within the system be taken, may be provided by many standard commercially available plumbing accessories. It will also be understood that although the invention has been described in terms of tubes having essentially cylindrical cross-section, since the presently most economic pipe has this form, it is equally applicable to tubular constructions having other non-cylindrical shapes.

We claim:

1. A method of making reverse osmosis apparatus, comprising:
    dissolving a cellulosic derivative and a pore-producing agent,
    casting said solution as a thin tubular sheet;
    at least partially desolvating said sheet; and
    immersing said sheet in water;
    heating said sheet while so immersed to a preselected temperature providing desired salt-reduction performance; and at a preselected pressure; and
    cooling said sheet while still immersed in water.

2. A method of making reverse osmosis apparatus as defined in claim 1, including:
    repeating said steps with higher heating temperature to form a plurality of tubular sheets of increasing salt-reduction performance, and
    connecting said tubular sheets in series to provide a channel of increasing salt-reduction performance.

3. A method of making reverse osmosis apparatus as defined in claim 1, wherein said membrane is maintained at a pressure exceeding its yield strength during said heating step.

4. A method of making reverse osmosis apparatus as defined in claim 3, including cooling said membrane under pressure after said heating step.

5. A method of making reverse osmosis apparatus as defined in claim 4, wherein said membrane is maintained at a pressure exceeding its yield strength during said cooling step.

6. A method of making reverse osmosis apparatus, comprising:
    dissolving a cellulosic derivative and a pore-producing agent;
    casting said solution as a thin layer on the wall of a tube;
    removing some of said solvent from said solution, whereby said cast solution gels as a tubular sheet;
    removing said sheet from said tube;
    supporting said sheet on a second tube;
    immersing said tube supported sheet in water; heating said sheet under pressure while so immersed; and cooling said tube-supported sheet while still so immersed.

7. A method of making reverse osmosis apparatus as defined in claim 6, including:
    repeating said steps with higher heating temperature to form a plurality of tubular sheets of increasing salt-reduction performance, and
    connecting said tubular sheets in series to provide a channel of increasing salt-reduction performance.

8. A method of making reverse osmosis apparatus as defined in claim 7, including cooling said sheet under pressure after heating said sheet.

9. A method of making reverse osmosis apparatus as defined in claim 6, including forming water flow means between said sheet and said second tube.

10. A method of making reverse osmosis apparatus as defined in claim 9, wherein said water flow means is formed by wrapping said sheet with porous material prior to supporting said sheet on said second tube.

11. A method of making reverse osmosis apparatus including:
    dissolving a cellulosic derivative and a pore-producing agent;
    casting said solution as a sheet on the wall of a casting tube;
    immersing said casting tube and sheet in water;
    removing said sheet from said casting tube;
    wrapping said sheet with porous material adapted to provide a desalinized water flow path;

supporting said sheet on a perforated run tube so that said porous material is between said sheet and run tube;

immersing said tube-supported sheet in water;

curing said sheet on said run tube by heating said sheet to a first temperature, whereby said sheet has a first salt-reduction ratio;

pressing said sheet against said porous material and said run tube simultaneously with heating said sheet, at a pressure exceeding the yield strength of said sheet at said first temperature;

cooling said sheet on said run tube to a run temperature at which said sheet may operate in reverse osmosis;

pressing said sheet against said porous material and said run tube simultaneously with cooling said sheet, at a pressure exceeding the yield strength of said sheet at said run temperature; and thereafter removing said sheet from said water.

12. A method of making reverse osmosis apparatus as defined in claim 11, including:

repeating all of said steps to form a second sheet on the wall of a second run tube, wherein said second sheet is heated to a second temperature whereby said second sheet has a second salt-reduction ratio; and connecting said first and second run tubes in series to provide a reverse osmosis channel of varying salt-reduction ratio.

13. A method of making reverse osmosis apparatus as defined in claim 1 wherein said casting comprises:

placing said solution within said casting tube, and spreading said solution on the inner walls of said casting tube.

14. A method of making reverse osmosis apparatus as defined in claim 11 wherein said casting comprises:

placing said solution within said casting tube, and spreading said solution on the inner walls of said casting tube.

15. The reverse osmosis apparatus substantially identical with the product obtainable in accordance with the process of claim 7.

References Cited

UNITED STATES PATENTS

| 3,060,119 | 10/1962 | Carpenter | 210—321 XR |
| 3,133,132 | 5/1964 | Loeb et al. | 264—49 |
| 3,341,024 | 9/1967 | Lowe et al. | 264—49 XR |

FOREIGN PATENTS

| 212,233 | 4/1924 | Great Britain. |

OTHER REFERENCES

British Chemical Engineering, "Membrane-Lined Glass Fibre Tube is Basis of Economical New Sea Water Conversion Process," December 1964, vol. 9, No. 12, p. 829.

U.S. Office of Saline Water, "The Mechanism of Desalination by Reverse Osmosis," Research and Development Report No. 84, by Aerojet-General Corp., Washington, D.C., U.S. Dept. of Interior, November 1963, pp. V–1 thru V–3.

U.S. Office of Saline Water, "Design and Construction of a Desalination Pilot Plant (A Reverse Osmosis Process)," Research and Development Report No. 86, by Aerojet-General Corp., Washington, D.C., U.S. Dept of Interior, January 1964, pp. 13–14.

PHILIP E. ANDERSON, *Primary Examiner.*

U.S. Cl. X.R.

210—321; 264—49, 216